Feb. 20, 1951     H. DREYFUSS     2,542,238
COMBINED GRILLE AND SCREEN FOR RADIATORS
Filed April 8, 1948
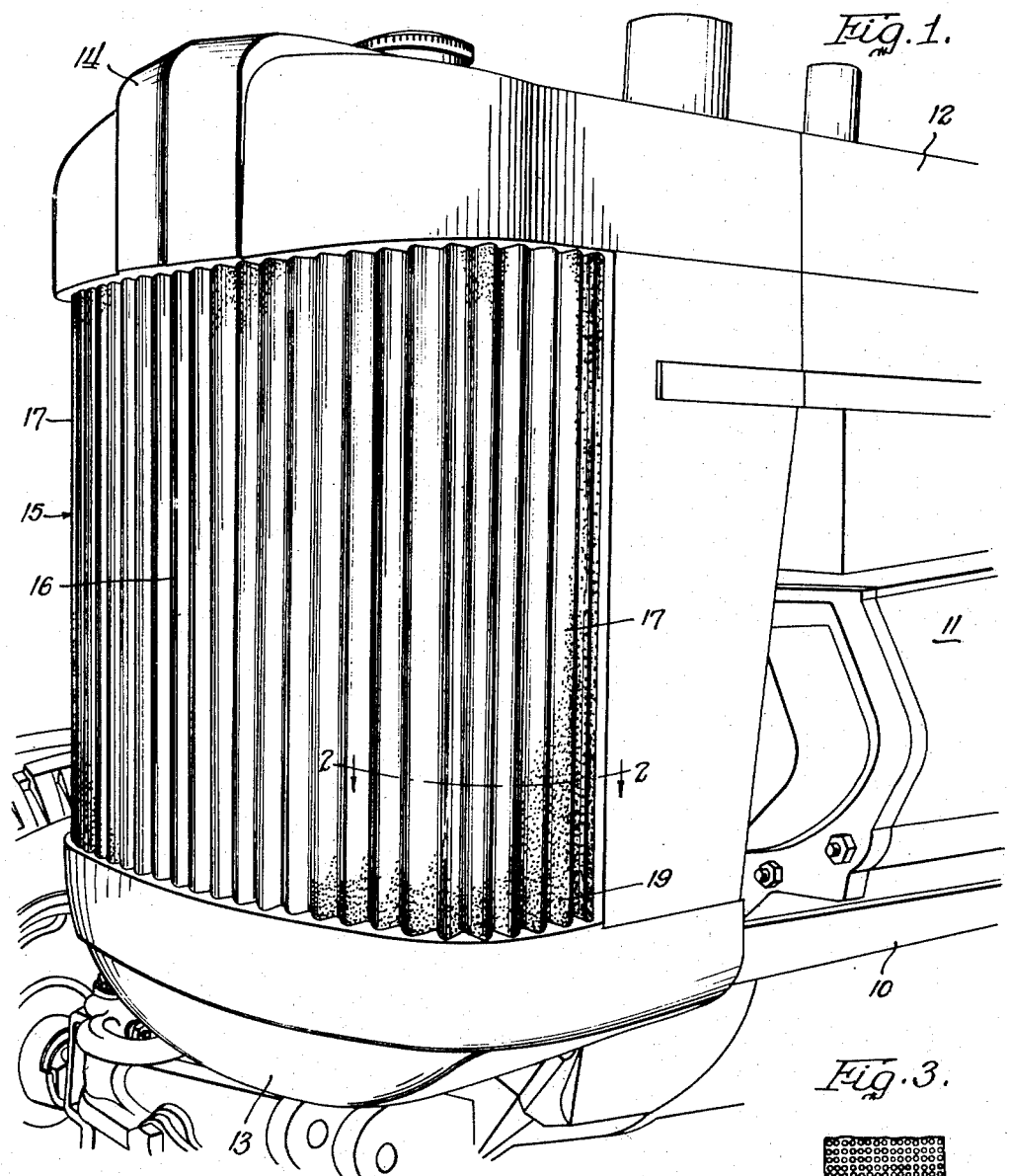
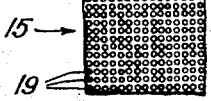
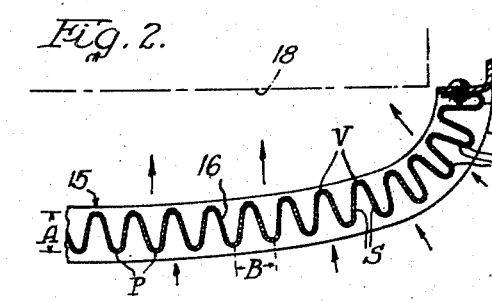
Inventor:
Henry Dreyfuss.

Patented Feb. 20, 1951

2,542,238

UNITED STATES PATENT OFFICE 2,542,238

COMBINED GRILLE AND SCREEN FOR RADIATORS

Henry Dreyfuss, New York, N. Y., assignor to Deere Manufacturing Co., Dubuque, Iowa, a corporation of Iowa Application April 8, 1948, Serial No. 19,780

2 Claims. (Cl. 180—68)

This invention relates to a grille structure for use with the radiator of an internal combustion engine such as is used on vehicles or power units. More particularly, the invention relates to a combined grille and screen structure which not only affords protection to the radiator but also screens from the radiator foreign particles borne by the air stream drawn through the radiator by the engine fan.

In its more specific aspects, the invention relates to the provision of structure of the aforementioned character for use in conjunction with internal combustion engines used in agricultural machinery, particularly agricultural tractors, wherein the use to which such machinery is put involves the likelihood of damage to the radiator core by contact with other machinery, buildings, branches, etc., plus the extreme likelihood of clogging of the radiator core by leaves, stalk fragments and other chaff. It has heretofore been the usual practice to provide an agricultural tractor, for example, with a protective grille comprising a plurality of spaced bars or louvres disposed ahead of the radiator. In addition to this grille, it is necessary to provide some kind of screening structure either ahead of or rearwardly of the grille for the purpose of preventing chaff and other material from clogging the radiator core. The location of the screen ahead of the grille is not particularly satisfactory, since the grille cannot protect the screen. The location of the screen behind the grille, although more practicable from the standpoint of protection of the screen, renders the screen rather inaccessible when it is necessary to clean off the accumulated chaff.

According to the present invention, it is a principal object to combine the grille and screen into a single unitary structure preferably formed of perforated sheet metal and having a plurality of corrugations therein containing alternate peaks and valleys, the corrugations preferably being uniform and disposed vertically to facilitate the cleaning of chaff therefrom. It is known construction, of course, to provide a sheet metal corrugated grille having perforations therein. However, such prior constructions utilize this structure solely as a protective measure and the perforations are so large as to afford little, if any, screening action; further, in such prior constructions the corrugations are relatively shallow and are provided solely for the purpose of strengthening the grille. In the present case the corrugations are relatively deep as respects the direction of air flow and the spacing between the peaks or crests of the corrugations is relatively narrow. In addition, the perforations are relatively small so as to have the greatest screening action and these perforations are substantially uniformly distributed throughout the peaks and valleys and throughout the relatively long and straight side walls that join the respective peaks and valleys. The rather closely spaced peaks thus provide means against which leaves and other relatively large chaff fragments may lodge when sucked onto the grille and screen structure by the engine fan; however, such leaves or chaff fragments will not obstruct the air flow through the valleys and associated side walls. Smaller chaff fragments will, of course, adhere to the valley bottoms and side walls but are not likely to adhere to the peaks of the corrugations, since the peaks are rounded and present convex surfaces to the air flow. The grille and screen structure is relatively self-cleaning, since the corrugations are vertical and the chaff will drop off the structure when the operation of the engine fan is stopped. The manner of corrugating or pocketing the grille and screen structure as aforesaid presents a greater frontal area to the air stream drawn therethrough by the engine fan.

It is a further object of the invention to provide a grille and screen structure having the characteristics mentioned above but which is substantially of U-shape in general cross section, thereby having an intermediate front portion and a pair of laterally spaced side portions, the side portions being also preferably corrugated and perforated in the manner aforesaid. In this respect, it will be evident that the largest low pressure area behind the grille will be that presented by the front or intermediate section of the grille, so that the side portions of the grille structure will remain relatively clean and will permit the entrance of air for cooling the radiator to provide for sustained operation of the engine without requiring frequent shut-downs for cleaning the accumulated chaff or other material from the grille and screen structure.

The foregoing and other important objects and desirable features inherent in and encompassed by the invention will become apparent to those skilled in the art as the disclosure of a preferred form of the invention is more fully made in the following detailed description and accompanying sheet of drawings, in which Figure 1 is a perspective view of the forward portion of a tractor equipped with a combined grille and screen structure constructed according to the principles of the invention;

Figure 2 is an enlarged fragmentary transverse sectional view of the grille and screen structure, as viewed substantially along the line 2—2 of Figure 1; and Figure 3 is a view of a fragment of the structure illustrating the perforations therein.

Although the preferred form of the invention is illustrated and will be described in connection with its use on an agricultural tractor, it will be understood that the principles of the invention will be similarly applicable in other instances requiring the cleaning of foreign material from a fluid stream. Likewise, certain variations may be permitted in the preferred structure illustrated in connection with the specific purposes set forth herein, all without departing from the spirit and scope of the invention as defined in the claims appended hereto.

There is shown in Figure 1 the forward portion of a tractor of well known construction having a main body 10, an internal combustion engine 11, an engine hood 12 and a forward enclosure unit for the engine radiator 18 (Fig. 2). This enclosure includes a lower shell member 13, preferably of sheet metal construction, an upper shell member 14, likewise preferably of sheet metal construction, and an intermediate combined grille and screen structure, designated generally by the numeral 15. The arrangement of the parts 13, 14 and 15 is such as to enhance the appearance of the front end of the tractor, besides having the structural and functional utility to be hereinafter described.

The fragmentary transverse sectional view of the combined grille and screen structure, as shown in Figure 2, reveals that this structure is a sheet, preferably of metal, substantially uniformly corrugated throughout by vertically running transversely spaced corrugations which extend throughout an intermediate or frontal section 16 of the structure and also throughout a pair of laterally spaced rearwardly extending side portions 17, only one of which is shown in Figure 2 but the presence of both of which is indicated in Figure 1. The general cross sectional shape of the grille structure, as viewed from above, is thus that of a U. The intermediate section 16 is preferably an arc formed on a relatively long radius, and the side portions 17 are arcuate and formed about relatively short radii to join the intermediate section in rounded corners.

In Figure 2 the numeral 18 is used to designate the front surface of the radiator core and the arrows indicate the direction of the air stream drawn through the radiator by the engine fan (not shown). The corrugations are so arranged as to provide a series of alternate peaks and valleys, P and V, respectively. The valleys are of substantial depth, as indicated by the dimension A (Figure 2), and the peaks are relatively closely spaced, as indicated by the dimension B in Figure 2. The dimensions A and B are preferably approximately the same; that is to say, the depth of the valleys is on the order of the spacing between the peaks, giving the structure a vertically pleated effect. The peaks P are rounded and present convex surfaces to the incoming air stream; and the valleys V are rounded and present concave surfaces to the air stream. The valleys and peaks are joined by straight side walls S of substantial length from front to rear, or as respects the general direction of air flow. Each valley thus provides a relatively deep pocket, the side walls of which converge slightly from front to rear, so that the side walls are generally parallel to the air stream. This is true even of the corrugations at the corners of the structure between the intermediate section 16 and the side portions or sections 17.

The grille and screen structure is substantially uniformly perforated throughout, the perforations being best indicated at 19 in Figure 3. As best shown in Figure 2, the perforations are distributed throughout the peaks P, the valleys V and the side walls S. In the preferred construction illustrated, the sheet metal stock of which the structure is formed is preferably on the order of .024 inch and the perforations or holes are .045 inch, for example, there being on the order of approximately 240 perforations or holes per square inch. The dimensions A and B are on the order of .875 inch and 1.25 inches, respectively, which, though not exactly equal are more nearly equal, or more closely approximate a ratio of 1:1, than screens or grilles of known construction.

It will be appreciated, of course, that the foregoing dimensions can be varied within relatively wide limits. However, in order to obtain the best results, the components of the structure must be such as to accomplish both adequate protection for the radiator core and efficient screening of chaff and other foreign particles without materially lowering the cooling efficiency of the core. It will be seen that the pleating of the structure to provide the relatively deep corrugations, and the perforations of the structure throughout, are such as to give the grille and screen structure a maximum perforated frontal area consistent with the cooling requirements of a core of a given size and type. The relatively narrow spacing of the peaks P enables the peaks to stop large fragments such as leaves or stalks, which will normally lie transversely across the peaks but will not obstruct air flow through the perforations in the side walls S or valley bottoms V. In the case of a flat screen or a screen having shallow corrugations, leaves, for example, would obstruct a substantial area of such screen. Further, in such case, continued air pressure on a leaf, for example, would cause the leaf to adhere rather tightly to the screen because of the relatively large area it occupies and it would not be likely to drop off when the engine fan is stopped. In the present case, the peaks P, being rounded, present, in effect, only single contact points or lines to which it is difficult for a leaf to adhere, and such leaf will ordinarily drop off when the engine is shut down. The depth of the corrugations, together with the narrow spacing of the peaks P, makes it difficult for even flexible leaves to wrap themselves around the peaks; although, as a practical matter there will be relatively few occasions in which green flexible leaves are apt to be encountered.

Although extremely fine chaff may eventually fill up the bottoms of the valleys V, at least the peaks P and portions of the side walls S will remain unclogged to permit the passage therethrough of the air stream for cooling the engine radiator. The capacity for the combined grille and screen structure for accepting chaff and the like without complete clogging is vastly greater than a flat or relatively flat screen. In this respect the efficiency characteristics of the present grille and screen structure, as compared with the same in a prior structure, are best measured by loss of or reduction in air speed as measured at the radiator core. In a comparison of this characteristic of a grille and screen structure constructed according to the present invention with a prior construction consisting of a louvred grill and rearwardly located screen, it was found that when subjected to a given amount of trash, the air speed loss in the former was slightly over one per cent, whereas the air speed loss in the latter when subjected to the same amount of trash was close to six per cent.

In addition to the higher efficiency, the present structure has the further advantage of combining the characteristics of protection and screening in one unit, together with the advantages of simplicity, low cost and pleasing appearance.

As previously stated, the corrugations are disposed vertically both for the purpose of adding to the pleasing appearance of the structure and also for the purpose of permitting the chaff to drop off the structure when the operation of the engine fan is stopped. From the standpoint of the basic structural aspect of the invention, it is broadly immaterial whether the corrugations run vertically or horizontally or whether the corrugations are provided by other structural components establishing the relatively deep and narrowly spaced pockets referred to above. The construction of the combined grille and screen structure according to the present disclosure is made on the basis of existing requirements and is not intended to exclude variations therein and other adaptations thereof.

What is claimed is:

1. A radiator grille structure for vertical disposition ahead of the radiator of an internal combustion engine, comprising: a perforated sheet of relatively thin material having a series of generally parallel corrugations providing substantial support against flexing in response to forces applied frontally to the grille, said corrugations being relatively deep and relatively closely spaced apart so that the depth is approximately equal to the spacing and so shaped as to provide alternate peaks and valleys joined by side walls extending from front to rear generally in the path of air flow through the grille to the radiator, and the perforations in the sheet being relatively small and substantially uniformly distributed throughout the peaks, valleys and side walls on the order of from one hundred to three hundred perforations per square inch, and the proportions of the depth of the corrugations and the peaks and valleys thereof and the number and size of the perforations being such as to present a total frontal area affording substantially no appreciable restriction to air flow through the grille and to the radiator.

2. A radiator grille structure for vertical disposition ahead of the radiator of an internal combustion engine, comprising: a perforated sheet of relatively thin material having a series of generally parallel corrugations providing substantial support against flexing in response to forces applied frontally to the grille, said corrugations being relatively deep and relatively closely spaced apart so that the depth is approximately equal to the spacing and so shaped as to provide alternate peaks and valleys joined by side walls extending from front to rear generally in the path of air flow through the grille to the radiator, and the perforations in the sheet being on the order of between .035" and .075" in diameter and substantially uniformly distributed throughout the sheet so as to be present in substantial number in the peaks and valleys and side walls.

HENRY DREYFUSS.

REFERENCES CITED

The following references are of record in the file of this patent:

UNITED STATES PATENTS

| Number | Name | Date |
| --- | --- | --- |
| D. 150,760 | Dreyfuss | Aug. 31, 1948 |
| 1,220,888 | Porter | Mar. 27, 1917 |
| 1,533,982 | Firkins | Apr. 14, 1925 |
| 1,914,253 | Green | June 13, 1933 |